(12) United States Patent
Kiyuna

(10) Patent No.: US 12,651,438 B2
(45) Date of Patent: Jun. 9, 2026

(54) TRAINING DEVICE, PREDICTION DEVICE, TRAINING METHOD, AND RECORDING MEDIUM

(71) Applicant: NEC Corporation, Minato-ku (JP)

(72) Inventor: Tomoharu Kiyuna, Tokyo (JP)

(73) Assignee: NEC CORPORATION, Tokyo (JP)

( * ) Notice: Subject to any disclaimer, the term of this patent is extended or adjusted under 35 U.S.C. 154(b) by 312 days.

(21) Appl. No.: 18/287,082

(22) PCT Filed: Apr. 22, 2021

(86) PCT No.: PCT/JP2021/016365
§ 371 (c)(1),
(2) Date: Oct. 16, 2023

(87) PCT Pub. No.: WO2022/224419
PCT Pub. Date: Oct. 27, 2022

(65) Prior Publication Data
US 2024/0203100 A1     Jun. 20, 2024

(51) Int. Cl.
*G06V 10/774*        (2022.01)
*G06V 10/25*         (2022.01)
*G06V 10/44*         (2022.01)
*G06V 20/70*         (2022.01)

(52) U.S. Cl.
CPC ........... *G06V 10/774* (2022.01); *G06V 10/25* (2022.01); *G06V 10/44* (2022.01); *G06V 20/70* (2022.01)

(58) Field of Classification Search
CPC ...... G06V 10/774; G06V 10/25; G06V 20/70; G06V 10/44
See application file for complete search history.

(56) References Cited

U.S. PATENT DOCUMENTS

2017/0236271 A1 * 8/2017 Kim ...................... G06F 16/583
                                                            382/128
2018/0189325 A1 * 7/2018 Hohwald ............ G06F 16/9038
2020/0051217 A1 * 2/2020 Shen .................... G06N 3/0495
(Continued)

FOREIGN PATENT DOCUMENTS

CA          3044063 A1 *  6/2018   ......... G06V 40/1394
KR    10-2163519 81        10/2020

OTHER PUBLICATIONS

Extended European Search Report for EP Application No. 21937911. 2, dated on Apr. 5, 2024.

(Continued)

*Primary Examiner* — Pinalben Patel
(74) *Attorney, Agent, or Firm* — Sughrue Mion, PLLC

(57) ABSTRACT

The partial image generation means generates partial images from the input image, and the partial image selection means selects a plurality of training partial images to be used as training data from all the generated partial images. The training means trains a prediction model for predicting a probability that a predetermined feature is included in the selected training partial images. The prediction means performs prediction for all the partial images using the trained prediction model. Then, the partial image selection means selects the plurality of training partial images to be used in a next training based on predicted values for all the partial images. The training of the prediction model by the training means is repeated while the training partial images are updated.

20 Claims, 13 Drawing Sheets

(56) References Cited

U.S. PATENT DOCUMENTS

| | | | | |
|---|---|---|---|---|
| 2021/0117773 | A1* | 4/2021 | Sollami | G06F 18/214 |
| 2021/0342570 | A1* | 11/2021 | Gregson | G06V 10/764 |
| 2022/0327322 | A1* | 10/2022 | Kandpal | G06N 3/08 |

OTHER PUBLICATIONS

Le Hou et al., "Patch-based Convolutional Neural Network for Whole Slide Tissue Image Classification", 2016 IEEE Conference on Computer Vision and Pattern Recognition (CVPR), Jun. 1, 2016, pp. 2424-2433, <DOI: 10.1109/CVPR.2016.266>.

International Search Report for PCT Application No. PCT/JP2021/016365, mailed on Jul. 20, 2021.

Dietterich et al. "Solving the multiple instance problem with axis-parallel rectangles". Artificial intelligence, vol. 89, Issues 1-2, Jan. 1997, pp. 31-71.

Takagi, Yusuke. "Expanding Multiple Instance Learning using a small number of lesion site", Preferred Networks, Nov. 11, 2020, [retrieval date Jul. 7, 2021], Internet :<URL: https://tech.preferred.jp/ja/blog/extendingmultiple-instance-learning-using-lesionannotation/>.

* cited by examiner

POSITIVE EXAMPLES
(INCLUDING GREEN)

NEGATIVE EXAMPLES
(NOT INCLUDING GREEN)

:AREA OF GREEN

FIG. 5
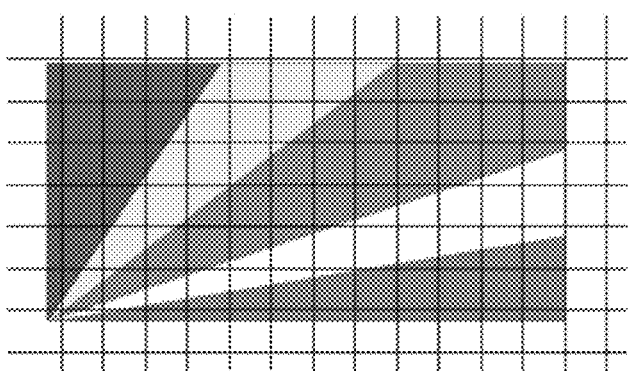
FIG. 6A
FIG. 6B
<POSITIVE EXAMPLE>
<NEGATIVE EXAMPLE>
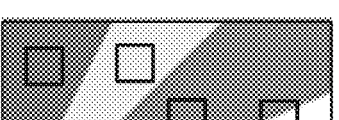
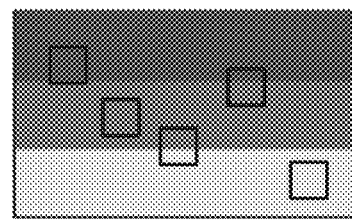
·PARTIAL IMAGES SELECTED
FROM POSITIVE EXAMPLE IMAGE
ARE ALL POSITIVE DATA
·PARTIAL IMAGES SELECTED
FROM NEGATIVE EXAMPLE IMAGE
ARE ALL NEGATIVE DATA

<LABEL CHANGE BY TRAINING LOOP>

| | 1st | | 2nd | | 3rd | | 4th | RESULT |
|---|---|---|---|---|---|---|---|---|
| PARTIAL IMAGE 71 : | NEGATIVE | → | NEGATIVE | → | NEGATIVE | → | NEGATIVE | ADOPTED |
| PARTIAL IMAGE 72 : | POSITIVE | → | POSITIVE | → | POSITIVE | → | POSITIVE | ADOPTED |
| PARTIAL IMAGE 73 : | NEGATIVE | → | POSITIVE | → | NEGATIVE | → | POSITIVE | EXCLUDED |

(1st TRAINING LOOP)

(5th TRAINING LOOP)

(PARTIAL IMAGES OF POSITIVE EXAMPLE
SELECTED IN 1st TRAINING LOOP)

(PARTIAL IMAGES OF POSITIVE EXAMPLE
SELECTED IN 5th TRAINING LOOP)

(DISPLAY EXAMPLE)

(DISPLAY EXAMPLE)

TRAINING DEVICE, PREDICTION DEVICE, TRAINING METHOD, AND RECORDING MEDIUM

This application is a National Stage Entry of PCT/JP2021/016365 filed on Apr. 22, 2021, the contents of all of which are incorporated herein by reference, in their entirety.

TECHNICAL FIELD

The present disclosure relates to techniques for predicting feature portions included in an image.

BACKGROUND ART

There are known techniques to classify and predict images by deep learning using a neural networks. In so-called supervised learning, training of a model is carried out using training data in which labels are given to input images. However, there is a case where the labels are given only for the entire image and it is not clear which part of the image should be used for training. Non-Patent Document 1 discloses a technique in which, in the above-described case, prediction is performed in units of a partial image generated by dividing an image into a plurality of portions, and training is performed using only the partial image of the highest predicted value.

PRECEDING TECHNICAL REFERENCES

Patent Document

Non-Patent Document 1: Dietterich et al. "Solving the multiple instance problem with axis-parallel rectangles". Artificial intelligence, Volume 89, Issues 1-2, January 1997, Pages 31-71

SUMMARY

Problem to be Solved

One object of the present disclosure is to train a model that performs prediction with high accuracy when labels are given only for the entire images.

Means for Solving the Problem

According to an example aspect of the present invention, there is provided a training device comprising:

a partial image generation means configured to generate partial images smaller than an input image from the input image;

a partial image selection means configured to select a plurality of training partial images to be used as training data from all the generated partial images;

a training means configured to train a prediction model for predicting a probability that a predetermined feature is included in the selected training partial images; and a prediction means configured to perform prediction for all the partial images using the trained prediction model, wherein the partial image selection means selects the plurality of training partial images to be used in a next training based on predicted values for all the partial images.

According to another example aspect of the present invention, there is provided a training method comprising:

generating partial images smaller than an input image from the input image;

selecting a plurality of training partial images to be used as training data from all the generated partial images;

training a prediction model for predicting a probability that a predetermined feature is included in the selected training partial images;

performing prediction for all the partial images using the trained prediction model; and selecting the plurality of training partial images to be used in a next training based on predicted values for all the partial images.

According to still another example aspect of the present invention, there is provided a recording medium recording a program, the program causing a computer to execute processing of:

generating partial images smaller than an input image from the input image;

selecting a plurality of training partial images to be used as training data from all the generated partial images;

training a prediction model for predicting a probability that a predetermined feature is included in the selected training partial images;

performing prediction for all the partial images using the trained prediction model; and selecting the plurality of training partial images to be used in a next training based on predicted values for all the partial images.

BRIEF DESCRIPTION OF THE DRAWINGS

FIG. 5 shows an example of a method for dividing an input image by an image dividing unit.

FIGS. 6A and 6B show examples of selecting partial images in an initial state.

EXAMPLE EMBODIMENTS

Preferred example embodiments of the present invention will be described with reference to the accompanying drawings.

<Basic Principle>

The present disclosure relates to deep learning when labels are only given for entire images and it is not known which part of the image is used for the prediction. Specifically, at the time of training, the prediction device divides the input image into a plurality of partial images and trains a prediction model which performs prediction for each of the partial images. Here, in the first stage of the training, the prediction device performs training using training data in which a label given to the entirety of the input image is used as a label for each partial image. On the other hand, when the training is performed and the trained model is obtained, the prediction device performs prediction for each partial image included in the input image using the trained model, and selects the partial images to be used in the next training based on the prediction result, thereby to generate training data. In this way, by repeating the training of the prediction model while updating the training data, a highly accurate prediction model is generated.

On the other hand, at the time of inference using the trained prediction model, the prediction device divides the input image into a plurality of partial images, performs prediction using the prediction model in units of the divided partial images, and integrates the prediction results for each partial image to obtain the prediction result for the input image. Also, the prediction device presents a part of the input image, which was important for prediction, based on the prediction result for each partial image.

First Example Embodiment

[Outline of Prediction Device]

Figure 1:
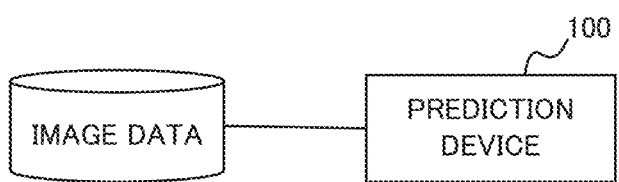
FIG. 1 shows a prediction device according to a first example embodiment.

FIG. 1 shows a prediction device according to a first example embodiment. The prediction device 100 performs prediction for the inputted image data (hereinafter, referred to as "input image"). Here, in the present example embodiment, it is assumed that the input images are images of national flags and the prediction device 100 predicts the probability that the green portion is included in the input image, as the feature of the input image.

[Hardware Configuration]

Figure 2:
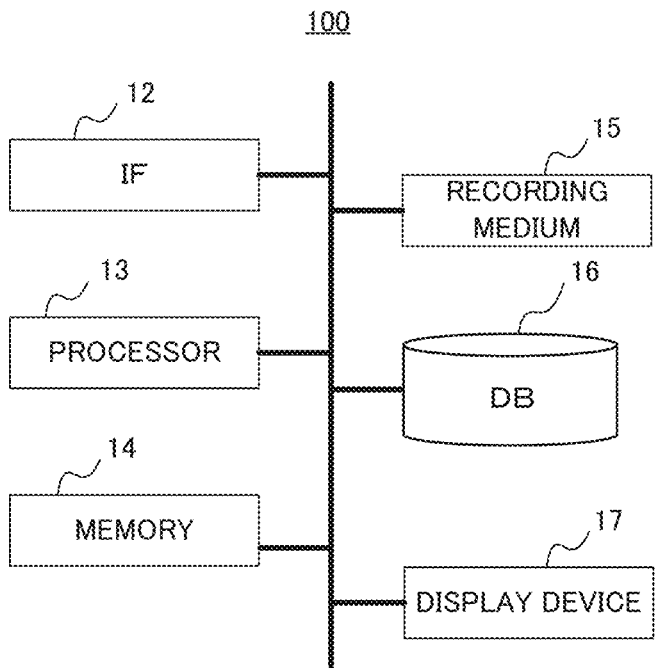
FIG. 2 is a block diagram showing a hardware configuration of the prediction device according to the first example embodiment.

FIG. 2 is a block diagram illustrating a hardware configuration of the prediction device 100 according to the first example embodiment. As shown, the prediction device 100 includes an interface (IF) 12, a processor 13, a memory 14, a recording medium 15, a database (DB) 16, and a display device 17.

The IF 12 receives image data used for training and inference of the prediction device 100. The processor 13 is a computer such as a CPU (Central Processing Unit) and controls the entire prediction device 100 by executing a program prepared in advance. The processor 13 may be a GPU (Graphics Processing Unit) or a FPGA (Field-Programmable Gate Array). Specifically, the processor 13 executes the training processing and the inference processing to be described later.

The memory 14 may include a ROM (Read Only Memory) and a RAM (Random Access Memory). The memory 14 stores various programs executed by the processor 13. The memory 14 is also used as a working memory during various processes performed by the processor 13.

The recording medium 15 is a non-volatile and non-transitory recording medium such as a disk-like recording medium, a semiconductor memory, or the like, and is configured to be detachable from the prediction device 100. The recording medium 15 records various programs executed by the processor 13. When the prediction device 100 executes various processing, the program recorded on the recording medium 15 is loaded into the memory 14 and executed by the processor 13.

The DB 16 stores the image data inputted through the IF 12. Specifically, the DB 16 stores image data used for the training of the prediction device 100. The display device 17 is, for example, a liquid crystal display device or a projector, and displays a prediction result by the prediction device 100. In addition to the above, the prediction device 100 may include an input device such as a keyboard or a mouse for the user to perform instructions and inputs.

[Functional Configuration for Training]

Figure 3:
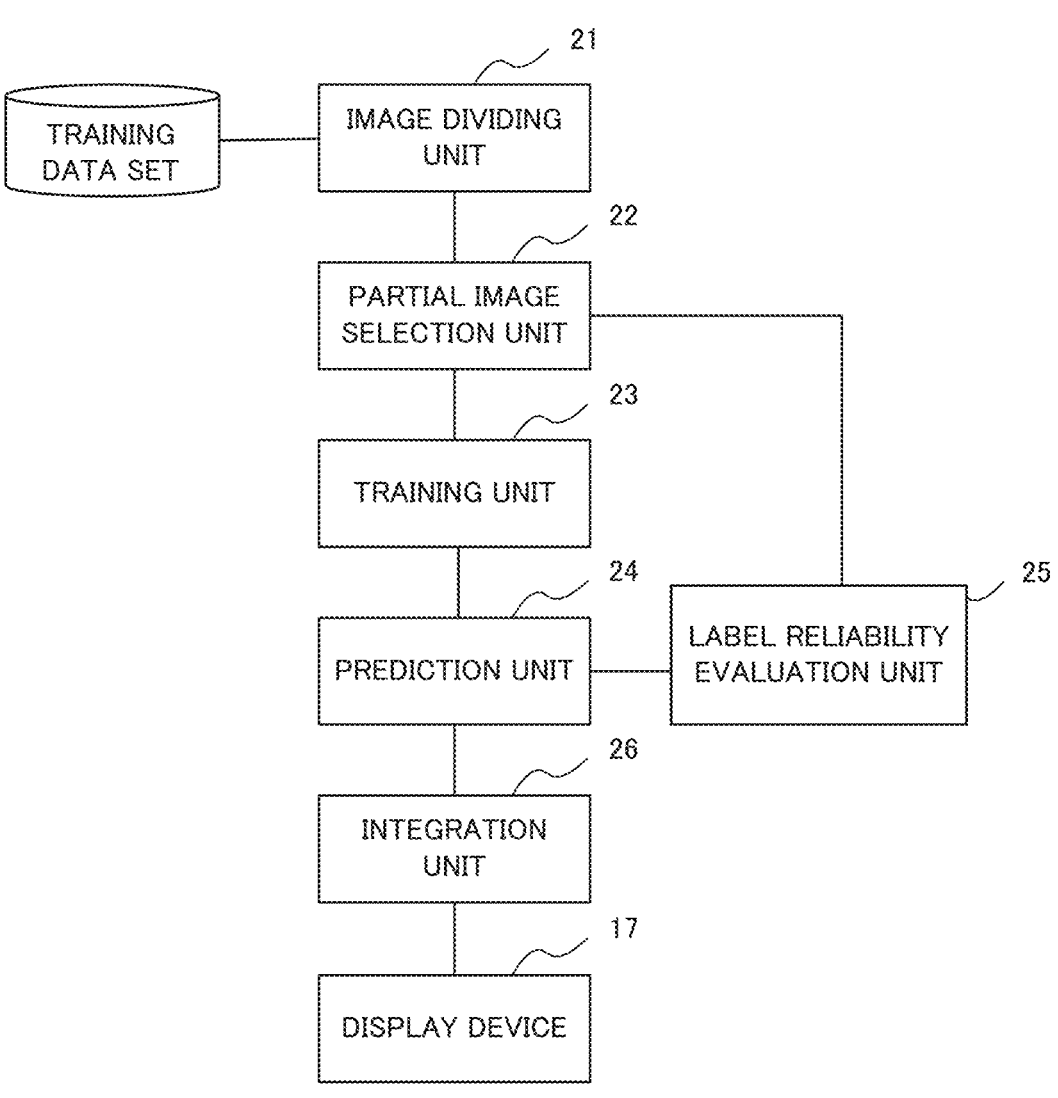
FIG. 3 is a block diagram showing a functional configuration of the prediction device for training.

FIG. 3 is a block diagram illustrating a functional configuration for the training of the prediction device. The prediction device 100a for the training functionally includes an image dividing unit 21, a partial image selection unit 22, a training unit 23, a prediction unit 24, a label reliability evaluation unit 25, and an integration unit 26. The output of the integration unit 26 is supplied to the display device 17.

Figure 4:
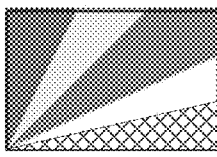
FIG. 4 shows an example of a training data set.
Figure 4:
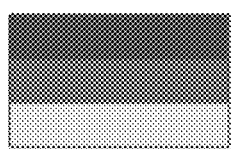
Figure 4:
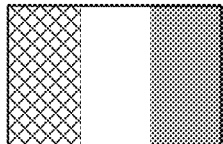
Figure 4:
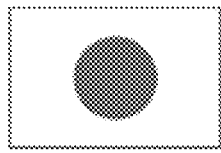
Figure 4:
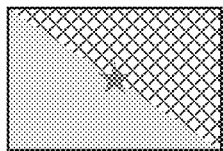
Figure 4:
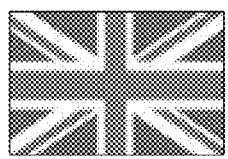
Figure 4:
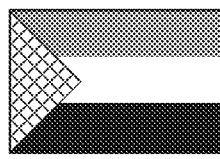
Figure 4:
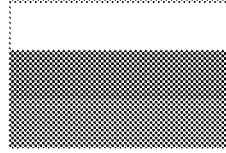

At the time of training, a training data set is prepared. In the following description, one input image and a label therefor are referred to as training data, and a set of training data for a plurality of input images is referred to as a training data set. FIG. 4 shows an example of a training data set. In the present example embodiment, since the prediction device 100a detects a national flag including a green portion, input images including a green color (an input image of a positive example) and input images not including green color (an input image of a negative example) are prepared. In FIG. 4, for convenience of illustration, the green portion is shown by hatching. In the training data set, a label indicating whether or not the input image include a green portion is given to the entirety of the input image.

The image dividing unit 21 divides the input image included in the training data set into the partial images smaller than the input image. As described above, since the training data set includes the input images of the positive example and the input images of the negative example, the image dividing unit 21 divides the input images of the positive example and the input images of the negative example into the partial images. FIG. 5 shows an example of a method of dividing an input image by the image dividing unit 21. The image dividing unit 21 simply divides the input image into equally spaced grids, as illustrated in FIG. 5, if there is no particular background knowledge. If there is background knowledge, the image dividing unit 21 may cut off the partial image from the input image around a specific position according to the background knowledge. The image dividing unit 21 outputs the obtained partial images to the partial image selection unit 22.

The partial image selection unit 22, the training unit 23, the prediction unit 24, and the label reliability evaluation unit 25 repeat, a predetermined number of times, the loop processing (hereinafter, referred to as "training loop") in which the training data is generated and the prediction model is trained.

Specifically, the partial image selection unit 22 selects the partial images used for training of the prediction model from a plurality of partial images inputted from the image dividing unit 21. FIGS. 6A and 6B shows the example of selection of the partial images in an initial state. In the initial state, i.e., in the first training loop, the partial image selection unit 22 randomly selects the partial images of a certain ratio (e.g., 20%) from a plurality of partial images obtained by dividing the input image of the positive example as shown in FIG. 6A, and uses them as the training data (also referred to as "positive data") to which a label of "positive" is given.

Incidentally, although the partial images included in the input image of the positive example includes the partial images of a color other than green as shown in FIG. 6A, the partial image selection unit 22 sets the label of all the partial images selected from the input image of the positive example to "positive".

Also, the partial image selection unit 22 uses all the partial images obtained by dividing the input image of the negative example as the training data to which the "negative" label is given (also referred to as "negative data"), as shown in FIG. 6B. Namely, since the green portion is not included in the input image of the negative example, the partial image selection unit 22 sets the label of all the partial images selected from the input image of the negative example to "negative". The partial image selection unit 22 outputs the partial images thus selected to the training unit 23 as the training data. The partial images selected by the partial image selection unit 22 are examples of training partial images.

The training unit 23 performs training of the prediction model using the partial images (with "positive" or "negative" label) inputted from the partial image selection unit 22 as the training data. The prediction model is a model which predicts the probability that the input image, which is a national flag, includes green. Specifically, as the prediction model, a deep learning model such as CNN (Convolutional Neural Network) can be used. The training unit 23 outputs the trained prediction model by the first training to the prediction unit 24.

The prediction unit 24 performs prediction for all the partial images forming the input image using the trained prediction model and calculates prediction values. Namely, for all the input images (including the input images of the positive example and the input images of the negative example) included in the training data set, the prediction unit 24 calculates the predicted values for all the partial images forming the input images and outputs the predicted values to the label reliability evaluation unit 25 and the integration unit 26.

The label reliability evaluation unit 25 determines the reliability of the label given to each of the partial images by the prediction unit 24 using the trained prediction model. Specifically, the label reliability evaluation unit 25 determines that the reliability of the label is low when the fluctuation or the variation of the predicted values calculated by the prediction unit 24 with respect to the partial image is large in a plurality of past training loops for each of the partial images. For example, the label reliability evaluation unit 25 determines that the reliability of the label of the partial image is low when the index such as the standard deviation of the predicted values calculated by the prediction unit 24 in a plurality of training loops is larger than a predetermined value for a certain partial image. Then, the label reliability evaluation unit 25 excludes the partial images whose reliability of the label is determined to be low, and outputs the remaining partial images to the partial image selection unit 22. In the first training loop, since the predicted values are not obtained yet for each of the partial images, the label reliability evaluation unit 25 outputs all the partial images outputted by the prediction unit 24 to the partial image selection unit 22.

Figure 7:
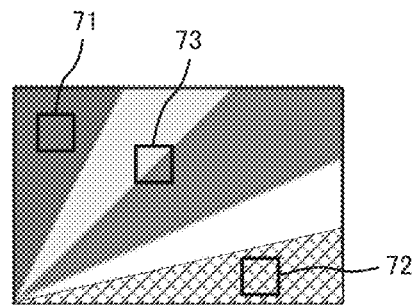
FIG. 7 is a diagram for explaining an example of processing by a label reliability evaluation unit.

FIG. 7 is a diagram for explaining another example of processing by the label reliability evaluation unit 25. Now, it is assumed that the training loop is repeated four times for the partial images 71 to 73 included in the input image shown in FIG. 7. For the partial image 71, since all the labels obtained by comparing the predicted value with a predetermined threshold value in four training loops are stably "negative", the label reliability evaluation unit 25 determines that the reliability of the label of the partial image 71 is high. Similarly, for the partial image 72, since all the labels obtained by comparing the predicted value with the threshold value in four training loops are stably "positive", the label reliability evaluation unit 25 determines that the reliability of the label of the partial image 72 is high. On the other hand, for the partial image 73, since the labels obtained by comparing the predicted value with the threshold value in the four training loops are unstably changes as "negative→positive→negative→positive", the label reliability evaluation unit 25 determines that the reliability of the label of the partial image 73 is low, and excludes the partial image 73.

Thus, at the time when the first training loop ends, the predicted value by the first trained prediction model is obtained for all the partial images included in each of the input images in the training data set. Therefore, the partial image selection unit 22 selects the partial images to be used as the training data in the next training loop based on the predicted value of each of the partial images. Specifically, for the partial images forming the input image of the positive example, the partial image selection unit 22 selects the partial images for which the predicted value is larger than a predetermined threshold value, and sets them to the positive data. Incidentally, the threshold value in this case is determined using binarization process of Otsu (Ohtsu) or a linear discriminant method, for example. On the other hand, for the partial images forming the input image of the negative example, the partial image selection unit 22 selects all the partial images and set them to the negative data. Thus, using the prediction model obtained in the previous training loop, the training data to be used in the next training loop is selected. If the number of partial images of the negative example selected in this way is much larger than the number of the partial images of the positive example, there is a risk that the model may be trained to perform prediction biased to the negative example. To prevent this, the balance of the numbers between the partial images of the positive example and the partial images of the negative examples may be adjusted by using only a part of the partial images of the negative example. In this case, the partial images of the negative example of a given ratio may be selected from the top of the predicted value, or may be selected at random.

Figure 8A:
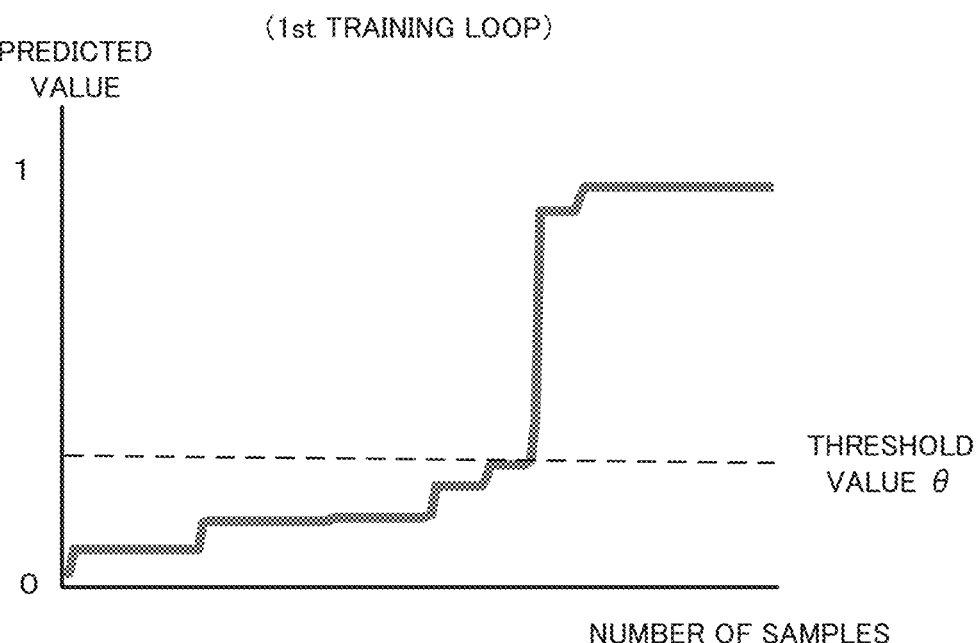
FIGS. 8A and 8B indicate distributions of predicted values of partial images obtained in first and fifth training loops.
Figure 8B:
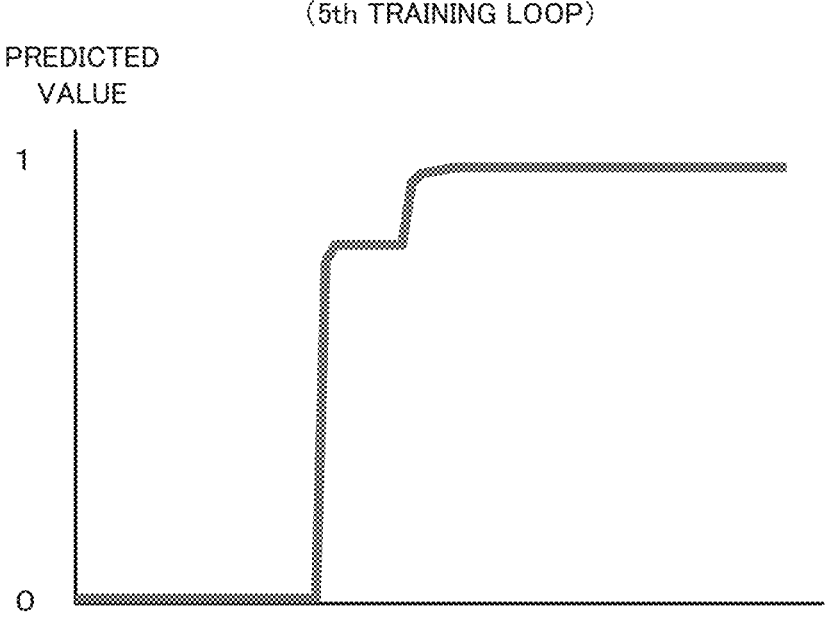

FIGS. 8A and 8B show the distributions of the predicted values of the partial images obtained in the first and fifth training loops. As can be seen from the comparison of FIG. 8A and FIG. 8B, by repeating the training loop, the predicted values are clearly divided into "0" and "1."

Figure 9A:
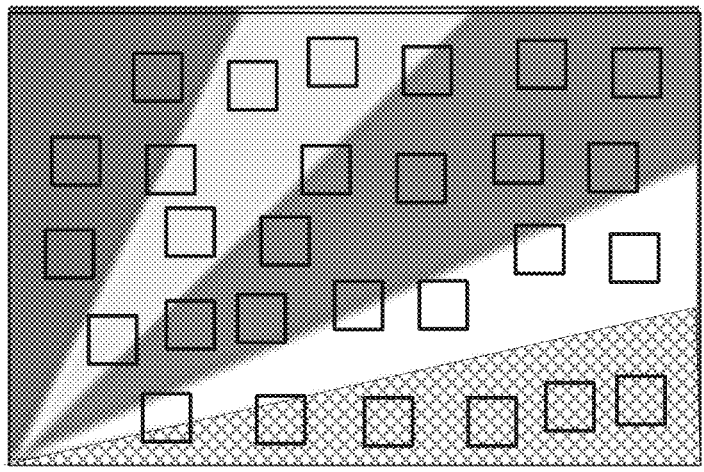
FIGS. 9A and 9B show examples of partial images of a positive example selected in the first and fifth training loops.
Figure 9B:
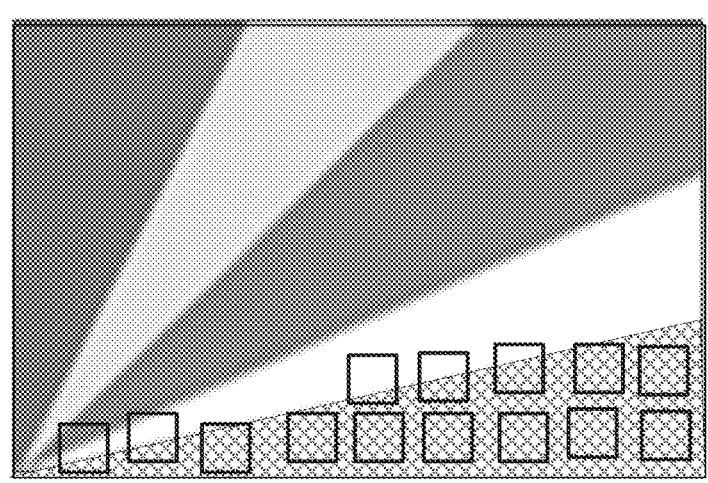

FIGS. 9A and 9B show examples of the partial images of the positive example selected in the first and fifth training loops. As shown in FIG. 9A, in the first training loop, the partial image selection unit 22 randomly selects a plurality of partial images from the input image of the positive example, and sets them to the positive data. Thereafter, the training loop is repeated, and the partial image selection unit 22 selects the partial images based on the prediction values calculated using the prediction model. The accuracy of the prediction model is improved by the repetition of the training loop, and in the fifth training loop, the partial image selection unit 22 becomes able to select the partial images from the green portion of the input image.

Figure 10A:
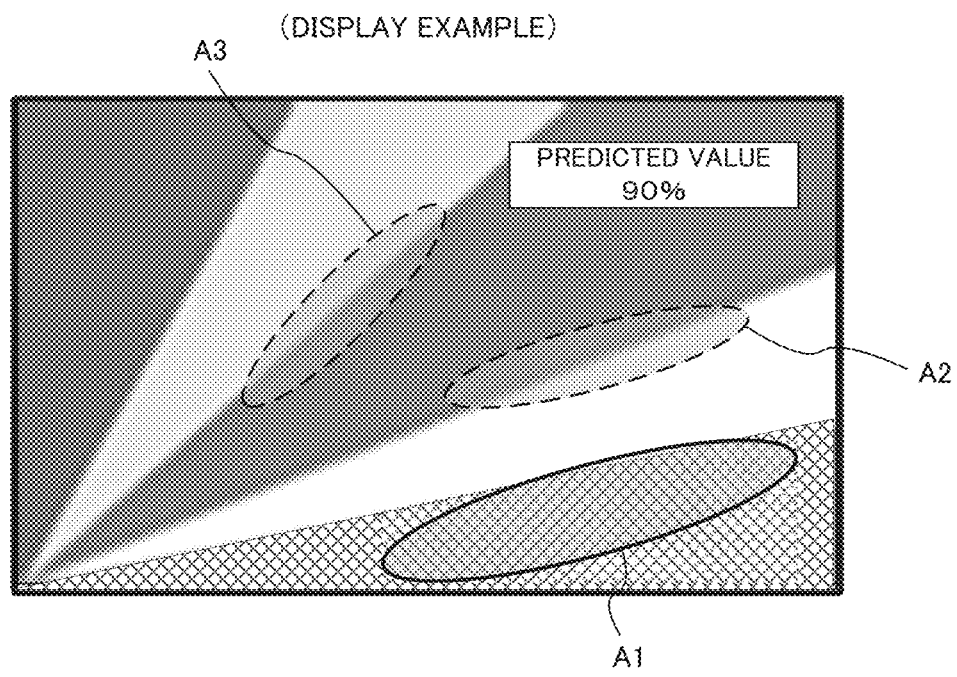
FIGS. 10A and 10B show display examples of a prediction result.

The integration unit 26 integrates the predicted values of the partial images outputted by the prediction unit 24 and generates a prediction result for the entirety of the input image. For example, for each input image, the integration unit 26 sets the average value of the predicted values of all the partial images forming the input image to the predicted value of the entirety of the input image. Then, the integration unit 26 displays the predicted value of the entirety of the input image on the display device 17 together with the input image. FIG. 10A shows a display example displayed on the display device 17. With the input image, the predicted value for the entirety of the input image is displayed.

Also, the integration unit 26 displays the area of the partial image in which the predicted value is equal to or higher than a predetermined threshold value as an important area in the prediction. In the display example of FIG. 10A, the area A1 belonging to the green portion (hatched portion) in the input image is displayed as the area important in the prediction, i.e., an area giving a large influence on the prediction result. Further, the integration unit 26 may display an area of the partial image in which the reliability of the label is determined to be low by the label reliability evaluation unit 25. In the display example of FIG. 10A, the areas A2 and A3 corresponding to the borders of the colors in the input image are displayed as the areas in which the reliability of the label is low.

The integration unit 26 may display the input image and the predicted value as shown in FIG. 10A when the repetition of the training loop for a predetermined number of times is completed, or may display the input image and the predicted value as shown in FIG. 10A continuously during the repetition of the training loop.

In the above-described configuration, the image dividing unit 21 is an example of a partial image generation means, the partial image selection unit 22 is an example of a partial image selection means, the training unit 23 is an example of a training means, the prediction unit 24 is an example of a prediction means, and the integration unit 26 is an example of an output means.

[Training Processing]

Figure 11:
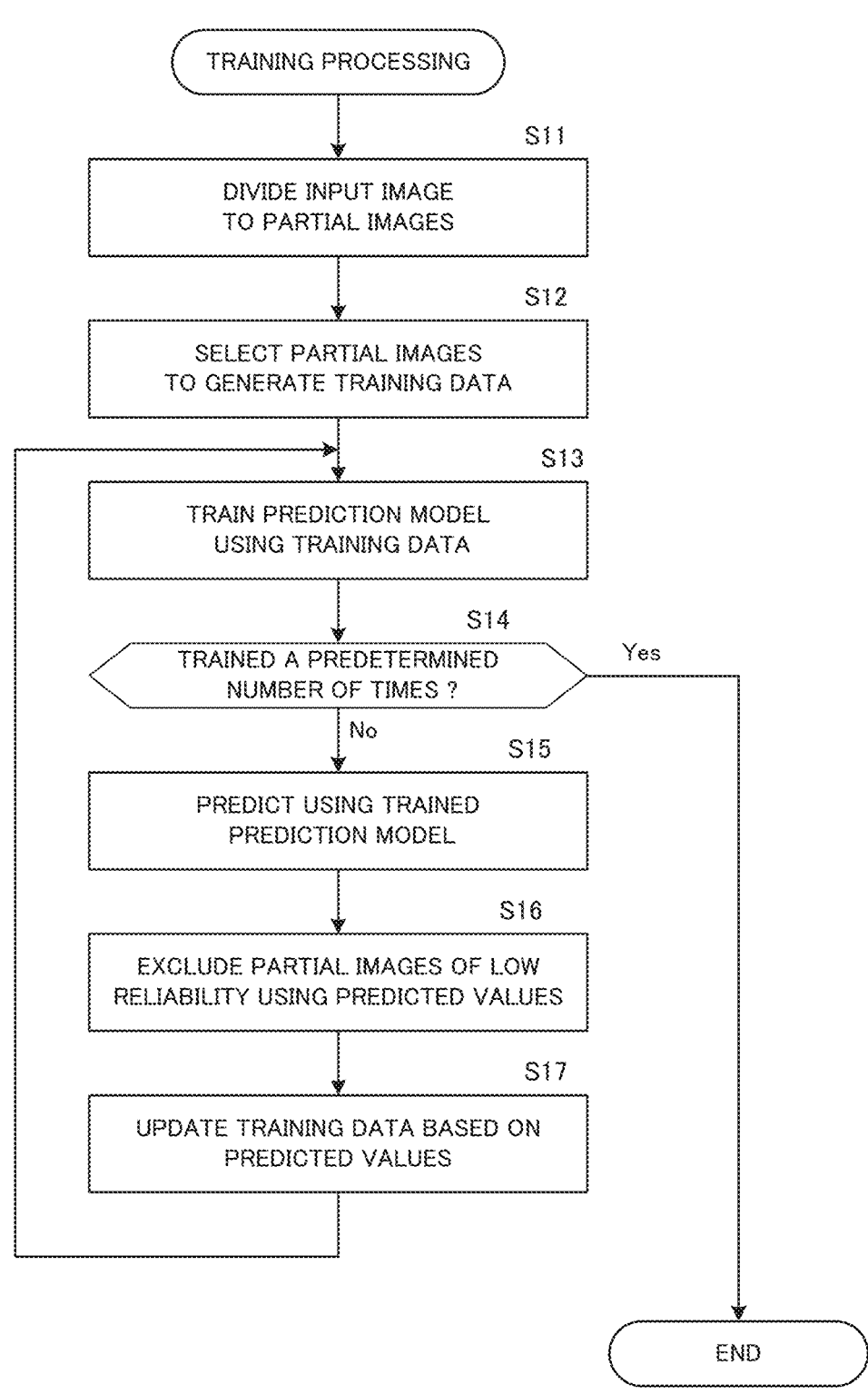
FIG. 11 is a flowchart of a training processing of the prediction device.

FIG. 11 is a flowchart of training processing performed by the prediction device 100a. This processing is realized by the processor 13 shown in FIG. 2, which executes a pre-prepared program and operates as the elements shown in FIG. 3.

First, the image dividing unit 21 receives the training data set, and divides each of the input images included in the training data set into the partial images (step S11). Next, the partial image selection unit 22 selects the partial images for each of the input images to generate the training data (step S12). In the first training loop, the partial image selection unit 22 randomly selects a predetermined number of partial images for the input image of the positive example and gives them a positive label, and selects all the partial images for the input image of the negative example and gives them a negative label. Alternatively, the partial image selection unit 22 may select, not all the partial images, but only a given percentage of the partial images for the input image of the negative example so as to balance the numbers of the partial images for the input images between the positive example and the negative example.

Next, the training unit 23 trains the prediction model using the training data generated in step S12 and generates a trained prediction model (step S13). Next, the prediction unit 24 determines whether or not the training unit 23 has trained the prediction model a predetermined number of times (step S14). When the training unit 23 has not trained the prediction model the predetermined number of times (step S14: No), the prediction unit 24 performs prediction for the partial images included in all the input images in the training data set using the trained prediction model generated in step S13 (step S15).

Next, the label reliability evaluation unit 25 evaluates the reliability of the label of each of the partial images based on the predicted value by the prediction unit 24, and excludes the partial images having a low reliable label (step S16). In the first training loop, since the predicted values in the past training loop do not exist, the label reliability evaluation unit 25 does not perform exclusion of the partial images. Next, the partial image selection unit 22 selects, as the training data, the partial images whose predicted value is equal to or higher than a predetermined threshold from the plurality of partial images after excluding the partial images having the low reliable label, and updates the training data (step S17). Then, the process returns to step S13.

Thus, the training loop of steps S13 to S17 is repeated until the training unit 23 performs the training the predetermined number of times. In the second and subsequent training loops, since the label reliability evaluation unit 25 excludes the partial images having the low reliability label using the prediction values obtained in the past training loops, the training of the prediction model is repeated based on more appropriate training data. Then, when the training unit 23 performs the training the predetermined number of times (step S14: Yes), the training processing ends.

[Functional Configuration for Inference]

Figure 12:
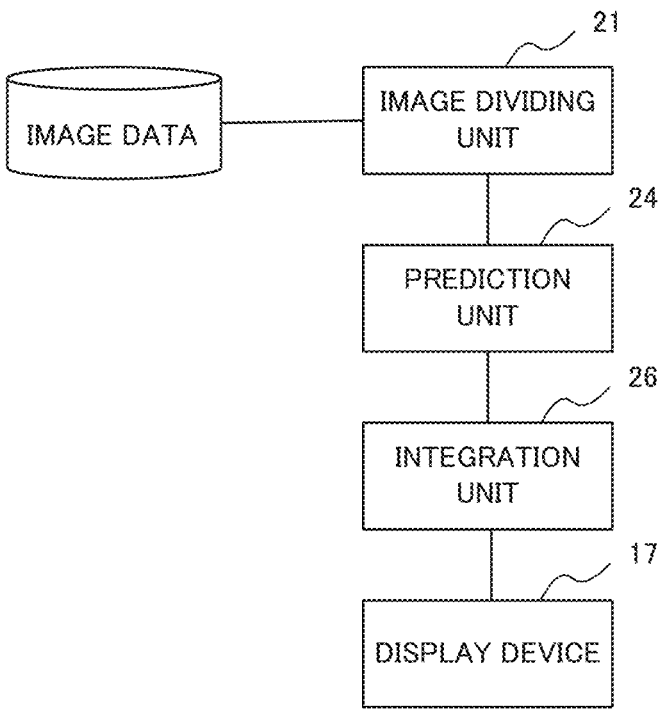
FIG. 12 is a block diagram showing a functional configuration of the prediction device for inference.

FIG. 12 is a block diagram illustrating a functional configuration of the prediction device for inference. The prediction device 100b for inference functionally includes an image dividing unit 21, a prediction unit 24, and an integration unit 26. The output of the integration unit 26 is supplied to the display device 17.

At the time of inference, the image data subjected to the prediction is prepared. In the present example embodiment, an image of a national flag is prepared as the image data, and is inputted to the image dividing unit 21 as the input image. The image dividing unit 21 divides the input image into a plurality of partial images in the same manner as in the training. For example, if the input image is divided into grids at equal intervals as shown in FIG. 5 at the time of training, the image dividing unit 21 divides the input image into the grids at the same interval at the time of inference. The image dividing unit 21 outputs the partial images obtained by the division to the prediction unit 24.

The prediction unit 24 performs prediction for the input image using the trained prediction model obtained by the above-described training processing. Specifically, the prediction unit 24 performs prediction using the trained prediction model for each of the partial images obtained by the image dividing unit 21 and outputs the prediction values to the integration unit 26.

Figure 10B:
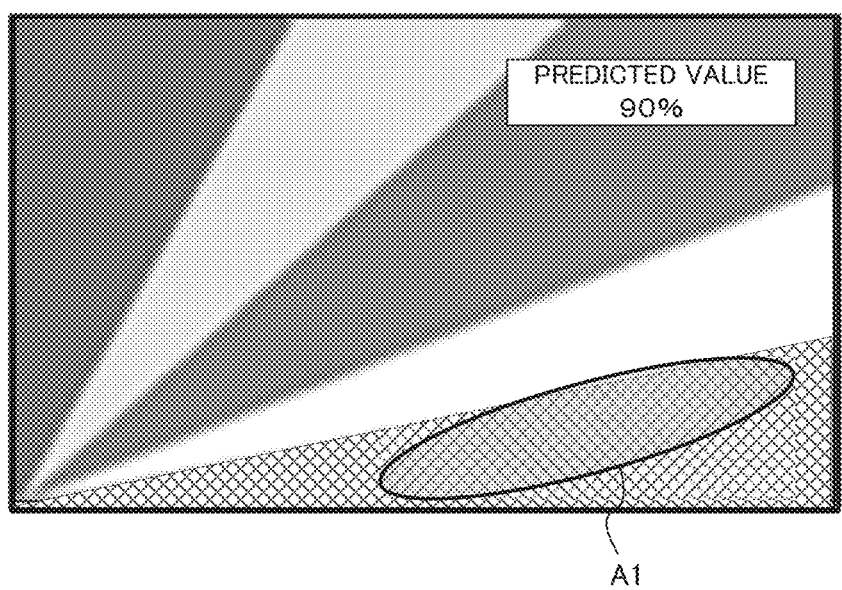

The integration unit 26 calculates the predicted value of the entirety of the input image by integrating the predicted values calculated by the prediction unit 24 for the partial images and outputs the predicted value of the entirety of the input image to the display device 17. The integration unit 26 may output the calculated prediction value to the external device. Thus, the probability that the input image, which is a national flag, includes green is obtained. In the prediction of the input image, the integration unit 26 extracts the area of the partial image in which the predicted value is equal to or higher than the predetermined reference value as an important area for the prediction, and outputs the extracted area to the display device 17. The display device 17 displays the predicted value and the important area A1 on the input image as illustrated in FIG. 10B. In this way, the prediction result for the input image is outputted.

The prediction model used by the prediction unit 24 is basically a prediction model at the time when the training loop is repeated the predetermined number of times, i.e., the final model. However, since the accuracy of the final model is not always the highest, the prediction model having the smallest prediction error among the prediction models obtained in the repeated training loops may be used in the prediction unit 24. Specifically, the prediction error may be calculated by comparing the prediction result by the prediction model obtained when each training loop ends with the training data set, and the prediction model with the smallest prediction error may be adopted.

Further, in the above example, one of the plurality of prediction models obtained by the plurality of training loops is used for prediction in the prediction unit 24. Instead, some of the plurality of prediction models obtained may be used in combination. Specifically, the prediction unit 24 may perform prediction for the input image using a plurality of prediction models obtained by the training loops executed a plurality of times, and may output the final prediction result by weighting and adding the plurality of prediction results obtained. In this case, it is preferable to give a larger weight to the output of the predictive model with higher accuracy.

[Inference Processing]

Figure 13:
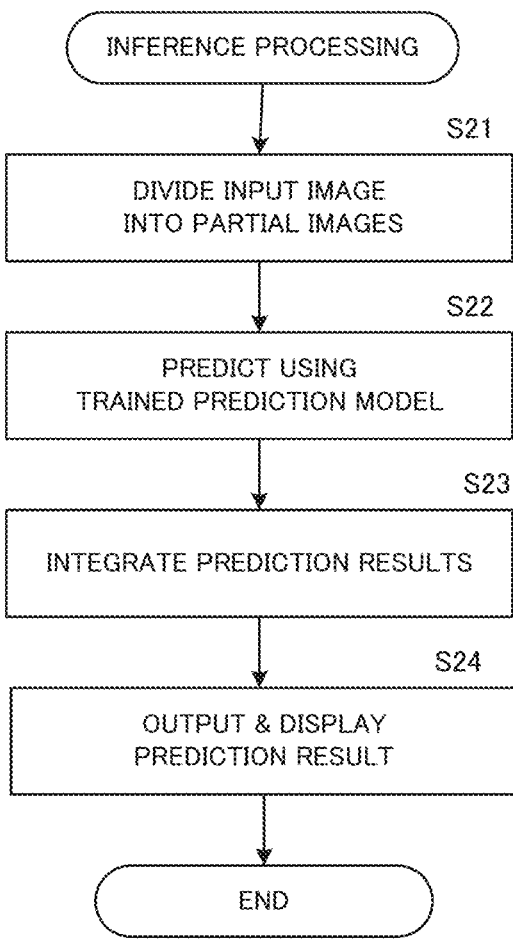
FIG. 13 is a flowchart of inference processing of the prediction device.

FIG. 13 is a flowchart of inference processing by the prediction device 100b. This processing is realized by the processor 13 shown in FIG. 2, which executes a pre-prepared program and operates as the elements shown in FIG. 12.

First, the image dividing unit 21 divides the input image into the partial images (step S21). Next, the prediction unit 24 performs prediction for the partial images using the trained prediction model obtained by the training processing and outputs the prediction values (step S22). Next, the integration unit 26 integrates the predicted values for the partial images and calculates the predicted result for the entirety of the input image (step S23). Then, the display device 17 displays the prediction result as illustrated in FIG. 10B, for example (step S24). Then, the inference processing ends.

Application Example

In the above example, the prediction device of the present example embodiment is used for detection of a green area in a national flag. As another example, description will be given of an example in which the prediction device of the present example embodiment is applied to prediction of the effect of medication (medicinal effect or success, hereinafter referred to as "medicinal effect"). In the field of the medical treatment, it is carried out to predict the medicinal effect based on the image using the pathological tissue image as an input. For example, there is a method to predict the medicinal effect based on the staining rate of the immune image using the image in which the cells containing the pathological tissue are stained. In this case, there are such problems that the determination of the staining rate varies depending on the inspector and that it is not clear which part in the image is a characteristic part reflecting the medicinal effect.

Therefore, the prediction device of the present example embodiment receives the pathological tissue image as an input, predicts the medicinal effect using the prediction model obtained by training, and outputs the prediction score of the medicinal effect, or display an area important for the determination of the medicinal effect.

Specifically, at the time of training, the training data in which the label indicating the presence or absence of the medicinal effect is given to the pathological tissue image is prepared, and the above-described training processing is executed to train the prediction model of the medicinal effect. At this time, in the method of the present example embodiment, since the labeling may be performed on the entire pathological tissue image, the labeling can be performed even if it is not clear which part in the pathological tissue image has the medicinal effect. Then, at the time of inference, it is possible to input a pathological tissue image as an object of prediction and predict the score of the medicinal effect using the trained prediction model. Further, it is possible to extract the area of the partial image which showed the high score in the inference processing as an important area in which the influence by the medicinal effect is large, and display the important area on the display device.

When this example embodiment is applied to the prediction of the medicinal effect, at the time of training and inference, the image dividing unit 21 may generate the partial images around the position of the cell nucleus in the input image by using such a background knowledge that information around the cell nucleus is particularly important for diagnosis, for example.

Second Example Embodiment

Figure 14:
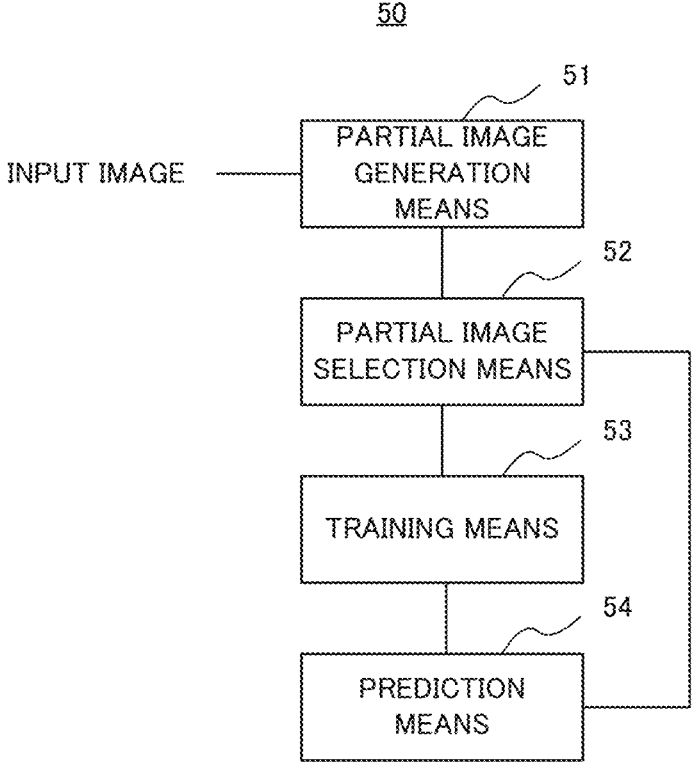
FIG. 14 is a block diagram showing a functional configuration of a training device of a second example embodiment.

FIG. 14 is a block diagram illustrating a functional configuration of a training device according to a second example embodiment. The training device 50 includes a partial image generation means 51, a partial image selection means 52, a training means 53, and a prediction means 54.

Figure 15:
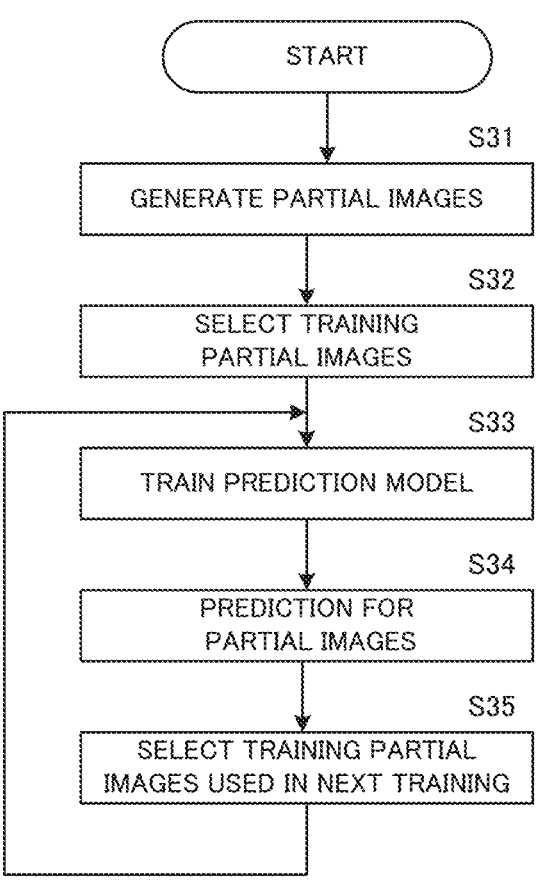
FIG. 15 is a flowchart of processing by the training device of the second example embodiment.

FIG. 15 is a flowchart of processing performed by the training device 50 according to the second example embodiment. First, the partial image generation means 51 generates partial images smaller than an input image from the input image (step S31). Next, the partial image selection means 52 selects a plurality of training partial images to be used as training data from all the generated partial images (step S32).

Next, the training means 53 trains a prediction model for predicting a probability that a predetermined feature is included in the selected training partial images (step S33). Next, the prediction means 54 performs prediction for all the partial images using the trained prediction model (step S34). Next, the partial image selection means 52 selects the plurality of training partial images to be used in a next training based on predicted values for all the partial images (step S35). Thus, the training of the prediction model by the training means 53 is repeated while the training partial images are updated.

According to the training device 50 of the second example embodiment, the prediction can be performed with high accuracy even when the label is given only to the entirety of the image and when it is not known which part of the image is a decisive factor of the prediction.

A part or all of the example embodiments described above may also be described as the following supplementary notes, but not limited thereto.

(Supplementary Note 1)

A training device comprising:

a partial image generation means configured to generate partial images smaller than an input image from the input image;

a partial image selection means configured to select a plurality of training partial images to be used as training data from all the generated partial images;

a training means configured to train a prediction model for predicting a probability that a predetermined feature is included in the selected training partial images; and a prediction means configured to perform prediction for all the partial images using the trained prediction model, wherein the partial image selection means selects the plurality of training partial images to be used in a next training based on predicted values for all the partial images.

(Supplementary Note 2)

The training device according to Supplementary note 1, wherein the partial image selection means selects the partial images in which the predicted value is equal to or higher than a predetermined threshold value as the training partial images in a second and subsequent training.

(Supplementary Note 3)

The training device according to Supplementary note 2, wherein the partial image selection means determines a reliability of the predicted value of each of the partial images based on the predicted values obtained through multiple predictions, and excludes the partial image whose reliability is lower than a predetermined reference value from the training partial images.

(Supplementary Note 4)

The training device according to Supplementary note 3, wherein the partial image selection means determines the reliability of each of the partial images based on a variation in the predicted values of each of the partial images.

(Supplementary Note 5)

The training device according to any one of Supplementary notes 2 to 4, wherein, in a first training, the partial image selection means randomly selects the training partial images from all the partial images for the input image of positive example which includes the predetermined feature, and selects all the partial images as the training partial images for the input image of negative example which does not include the predetermined feature.

(Supplementary Note 6)

The training device according to Supplementary note 5, wherein, in the first training, the training means uses a label given in advance to an entirety of the input image as a label for each of the training partial images included in the input image.

(Supplementary Note 7)

A prediction device comprising:

a partial image generation means configured to generate partial images smaller than the input image from the input image;

a prediction means configured to predict a probability that the predetermined feature is included in the partial image for all the generated partial images using the prediction model trained by the training device according to any one of Supplementary notes 1 to 6; and an output means configured to integrate a prediction result for all the partial images and outputs a prediction score indicating a probability that the predetermined feature is included in the input image.

(Supplementary Note 8)

The prediction device according to Supplementary note 7, wherein the output means determines an area in which the predetermined feature is included in the input image based on the prediction result for all the partial images, and displays the area on a display device.

12

(Supplementary Note 9)

A training method comprising:

generating partial images smaller than an input image from the input image;

selecting a plurality of training partial images to be used as training data from all the generated partial images;

training a prediction model for predicting a probability that a predetermined feature is included in the selected training partial images;

performing prediction for all the partial images using the trained prediction model; and selecting the plurality of training partial images to be used in a next training based on predicted values for all the partial images.

(Supplementary Note 10)

A recording medium recording a program, the program causing a computer to execute processing of:

generating partial images smaller than an input image from the input image;

selecting a plurality of training partial images to be used as training data from all the generated partial images;

training a prediction model for predicting a probability that a predetermined feature is included in the selected training partial images;

performing prediction for all the partial images using the trained prediction model; and selecting the plurality of training partial images to be used in a next training based on predicted values for all the partial images.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

13 Processor
17 Display device
21 Image dividing unit
22 Partial image selection unit
23 Training unit
24 Prediction unit
25 Label reliability evaluation unit
26 Integration unit
100, 100a, 100b prediction device

What is claimed is:

1. A prediction device comprising:

one or more memories storing instructions; and one or more processors configured to execute the instructions to:

predict, for a plurality of partial images generated from an input image, a probability that a predetermined feature is included in each of the plurality of partial images, using a prediction model; and integrate predicted values for the plurality of partial images to output a prediction score indicating a probability that the predetermined feature is included in the input image, wherein the prediction model is obtained by a training process comprising:

(a) selecting a plurality of training partial images from the plurality of partial images;

(b) training the prediction model using the selected plurality of training partial images;

(c) performing prediction for the plurality of partial images using the trained prediction model to obtain the predicted values; and (d) selecting, based on the obtained predicted values, new training partial images from the plurality of partial images to be used in a subsequent training of the prediction model.

2. The prediction device of claim 1, further comprising a display device, wherein the one or more processors are further configured to determine, based on the predicted values, an area in which the predetermined feature is included in the input image and to display the area on the display device.

3. The prediction device of claim 1, wherein the integration of the predicted values comprises computing an average of the predicted values of the plurality of partial images.

4. The prediction device of claim 1, wherein the prediction comprises applying a plurality of prediction models obtained during the training process to each of the plurality of partial images and combining their outputs by weighted addition.

5. The prediction device of claim 1, wherein the prediction model used for the prediction is selected, from among a plurality of prediction models obtained during repeated trainings in the training process, as a prediction model having a smallest prediction error with respect to a validation dataset.

6. The prediction device of claim 1, wherein the training of the prediction model in the training process is performed using deep learning.

7. The prediction device of claim 1, wherein the prediction score is used for decision making regarding a state represented in the input image.

8. A prediction method comprising:

predicting, by one or more processors for a plurality of partial images generated from an input image, a probability that a predetermined feature is included in each of the plurality of partial images, using a prediction model; and integrating, by the one or more processors, predicted values for the plurality of partial images to output a prediction score indicating a probability that the predetermined feature is included in the input image, wherein the prediction model is obtained by a training process comprising:

(a) selecting a plurality of training partial images from the plurality of partial images;

(b) training the prediction model using the selected plurality of training partial images;

(c) performing prediction for the plurality of partial images using the trained prediction model to obtain the predicted values; and (d) selecting, based on the obtained predicted values, new training partial images from the plurality of partial images to be used in a subsequent training of the prediction model.

9. The prediction method of claim 8, further comprising determining, based on the predicted values, an area in which the predetermined feature is included in the input image and displaying the area on a display device.

10. The prediction method of claim 8, wherein the integration of the predicted values comprises computing an average of the predicted values of the plurality of partial images.

11. The prediction method of claim 8, wherein the prediction comprises applying a plurality of prediction models obtained during the training process to each of the plurality of partial images and combining their outputs by weighted addition.

12. The prediction method of claim 8, wherein the training of the prediction model in the training process is performed using deep learning.

13. The prediction method of claim 8, wherein the prediction score is used for decision making regarding a state represented in the input image.

14. A non-transitory computer-readable recording medium storing a program which, when executed by one or more processors, causes a computer to perform a method comprising:

predicting, for a plurality of partial images generated from an input image, a probability that a predetermined feature is included in each of the plurality of partial images, using a prediction model; and integrating predicted values for the plurality of partial images to output a prediction score indicating a probability that the predetermined feature is included in the input image, wherein the prediction model is obtained by a training process comprising:

(a) selecting a plurality of training partial images from the plurality of partial images;

(b) training the prediction model using the selected plurality of training partial images;

(c) performing prediction for the plurality of partial images using the trained prediction model to obtain the predicted values; and (d) selecting, based on the obtained predicted values, new training partial images from the plurality of partial images to be used in a subsequent training of the prediction model.

15. The non-transitory computer-readable recording medium of claim 14, the method further comprising determining, based on the predicted values, an area in which the predetermined feature is included in the input image and displaying the area on a display device.

16. The non-transitory computer-readable recording medium of claim 14, wherein the integration of the predicted values comprises computing an average of the predicted values of the plurality of partial images.

17. The non-transitory computer-readable recording medium of claim 14, wherein the prediction comprises applying a plurality of prediction models obtained during the training process to each of the plurality of partial images and combining their outputs by weighted addition.

18. The non-transitory computer-readable recording medium of claim 14, wherein the prediction model used for the prediction is selected, from among a plurality of prediction models obtained during repeated trainings in the training process, as a prediction model having a smallest prediction error with respect to a validation dataset.

19. The non-transitory computer-readable recording medium of claim 14, wherein the training of the prediction model in the training process is performed using deep learning.

20. The non-transitory computer-readable recording medium of claim 14, wherein the prediction score is used for decision making regarding a state represented in the input image.

* * * * *